(12) United States Patent
Taylor

(10) Patent No.: US 6,256,127 B1
(45) Date of Patent: Jul. 3, 2001

(54) MODULATION FORMAT ADJUSTING OPTICAL TRANSPONDERS

(75) Inventor: Michael G. Taylor, Laurel, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/519,828

(22) Filed: Mar. 6, 2000

Related U.S. Application Data

(63) Continuation of application No. 08/862,930, filed on May 29, 1997.

(51) Int. Cl.$^7$ ................................................. H04J 14/02
(52) U.S. Cl. ............................ 359/124; 359/125; 375/279
(58) Field of Search ..................................... 359/124, 125, 359/173, 110, 279

(56) References Cited

U.S. PATENT DOCUMENTS

| | | | |
|---|---|---|---|
| 4,584,720 | * 4/1986 | Garrett | 455/608 |
| 5,483,372 | * 1/1996 | Green, Jr. | 359/173 |
| 5,504,609 | * 4/1996 | Alexander et al. | 359/125 |
| 5,541,755 | * 7/1996 | Noe et al. | 359/110 |
| 5,559,624 | 9/1996 | Darcle et al. | 359/175 |
| 5,594,384 | * 1/1997 | Carroll et al. | 324/369 |
| 5,594,577 | * 1/1997 | Majima et al. | 359/124 |
| 5,625,327 | * 4/1997 | Carroll et al. | 331/74 |
| 5,726,784 | * 3/1998 | Alexander et al. | 359/125 |
| 5,784,184 | * 7/1998 | Alexander et al. | 359/125 |
| 5,960,040 | * 9/1999 | Cai et al. | 375/279 |
| 6,101,011 | * 8/2000 | Taylor | 359/124 |

FOREIGN PATENT DOCUMENTS

| | | | |
|---|---|---|---|
| 0042229 | 12/1981 | (EP) | H04B/17/02 |
| 0477699 | 4/1992 | (EP) | H04J/14/02 |
| 2254746 | 10/1992 | (GB) | H04B/10/04 |

OTHER PUBLICATIONS

Copy of PCT—International Search Report and Notification of Transmittal of the International Search Report or the Declaration, mailed Oct. 30, 1998 (7 pages total).

Kikushima, et al., "Super–Wide–Band Optical FM Modulation Scheme and Its Application to Multichannel AM Video Transmission Systems" IEEE Photonics Technology Letters, vol. 8, No. 6, Jun. 1996, pp. 839–841.

* cited by examiner

Primary Examiner—Jeffery Hofsass
Assistant Examiner—John Tweel, Jr.
(74) Attorney, Agent, or Firm—David L. Soltz; Michael R. Cammarata

(57) ABSTRACT

The present invention provides a modulation format adjusting optical transponder for receiving an incident optical signal of a first modulation format and outputting an optical signal having a different modulation format. The transponder includes an optical-to-electrical conversion element configured to receive an information-bearing optical signal having a first modulation format and output an electrical signal corresponding to information from the incident optical signal. The transponder includes a laser for outputting an optical carrier signal at a selected wavelength and a modulator communicating with the optical-to-electrical conversion element and with the laser. The modulator places the information from the incident optical signal onto the optical signal output by the laser, creating a modulated optical output signal having a second modulation format different from the first modulation format. Advantageously, the optical system of the present invention can take optical signals in a common modulation format, such as amplitude modulation, and output optical signals in a power-flat modulation format, such as frequency shift key (FSK) modulation. The modulation format adjusting optical transponders of the present invention can be used as remodulators for wavelength division multiplexed optical systems.

8 Claims, 2 Drawing Sheets

US 6,256,127 B1

MODULATION FORMAT ADJUSTING OPTICAL TRANSPONDERS

This application is a continuation of U.S. patent application Ser. No. 08/862,930 filed May 29, 1997.

FIELD OF THE INVENTION

The invention relates to optical transponders generally and, more particularly, to optical transponders which change the modulation format of incident optical signals.

BACKGROUND OF THE INVENTION

Optical communication systems are a substantial constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference.

Optical transmitters are typically available in a particular modulation format. Depending upon the transmission medium for a given optical system, it may be desirable to use a specific modulation format to enhance the transmission characteristics of the launched optical signal.

In some optical systems wavelength division multiplexing (WDM) is employed to increase the capacity of the fiber optic network. In a WDM system, plural optical channels are carried over a single waveguide, each channel being assigned a particular wavelength. To provide compatibility of the WDM format with existing networks, it is desirable to convert a signal from a received transmission wavelength to a specific channel wavelength within the WDM system. In assignee's prior patent and patent application, U.S. Pat. No. 5,504,609 and Ser. No. 08/624,269, the disclosures of which are incorporated herein by reference, a series of optical remodulators are used to take input signals from various optical transmitters and output the information onto optical channels within the channel plan of a WDM optical system. Typically, the modulation formats of the optical signals output by the optical transmitters and the remodulators is the same. However, depending upon the type of optical receivers employed and the transmission characteristics of the optical system, it may be desirable to change the modulation format of the optical transmitters to a format which is better suited to transmission in the WDM optical system.

Thus, there is a need in the art for optical transponders which can change the modulation format of incident optical signals. There is a further need in the art for improved WDM optical communication systems which can receive incoming optical transmitter signals of various modulation formats and place the information onto WDM system optical channels in a different modulation format from that of the transmitter optical signals.

SUMMARY OF THE INVENTION

The present invention provides a modulation format adjusting optical transponder for receiving an incident optical signal of a first modulation format and outputting an optical signal having a different modulation format. The transponder includes an optical-to-electrical conversion element configured to receive an information-bearing optical signal having a first modulation format and output an electrical signal corresponding to information from the incident optical signal. The transponder includes a laser for outputting an optical carrier signal at a selected wavelength and a modulator communicating with the optical-to-electrical conversion element and with the laser. The modulator places the information from the incident optical signal onto the optical signal output by the laser, creating a modulated optical output signal having a second modulation format different from the first modulation format. Advantageously, the optical transponders of the present invention can take optical signals in a common modulation format, such as amplitude modulation, and output optical signals in a power-flat modulation format, such as frequency shift key (FSK) modulation. The modulation format adjusting optical transponders of the present invention can be used as remodulators for wavelength division multiplexed optical systems.

DETAILED DESCRIPTION

Figure 1:
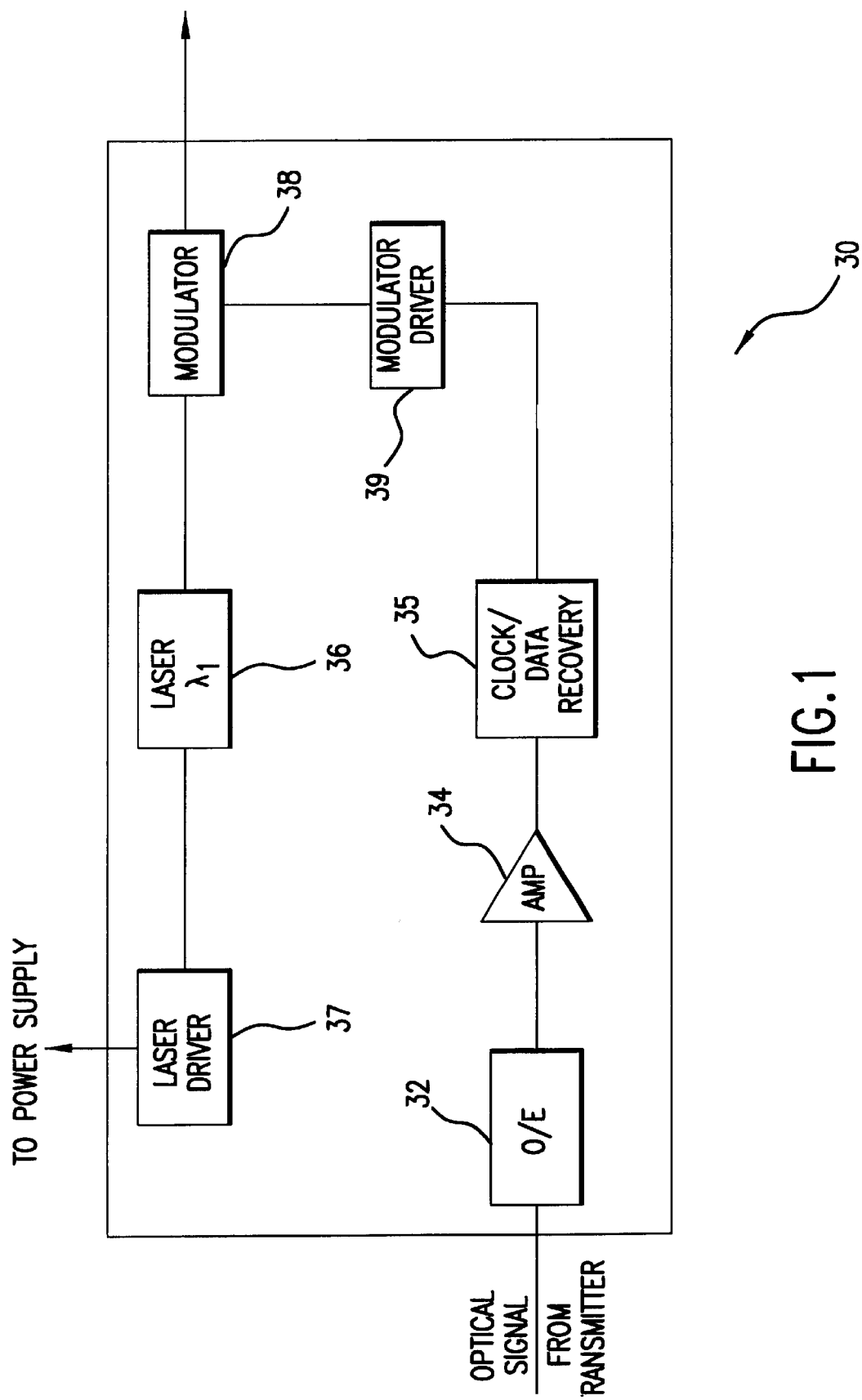
FIG. 1 schematically depicts a modulation format adjusting optical transponder according to the present invention.

Turning to the drawings in detail, FIG. 1 schematically depicts a modulation format adjusting optical transponder 30 according to the present invention. Transponder 30 receives an optical signal output by an optical transmitter. The input optical signal is converted by optoelectronic converter 32, typically a photodiode, to an electrical signal.

The resultant electrical signal is amplified by amplifier 34, and routed through clock and data recovery circuit 35. Following retiming, the electrical signal passes to modulator driver 39 which drives modulator 38. (It is noted that while modulator 38 is an external modulator such as a Mach-Zehnder modulator, other techniques for modulating the optical signal including electroabsorption modulators and direct modulation can be used in the present invention.)

Transponder 30 includes an optical source, such as laser 36, for delivering a non-information-bearing optical carrier signal to the laser output waveguide. In an exemplary embodiment, laser 36 is a DFB semiconductor diode laser, generally comprising one or more III-V semiconductor materials, commercially available from a wide variety of suppliers such as Fujitsu, GEC Marconi, and Hewlett-Packard. The laser outputs an optical carrier signal at a particular optical wavelength, $\lambda_1$, (which, in the case of a WDM optical system, is a wavelength corresponding to a demultiplexer wavelength included in a receiving system). Laser driver 37 provides the required laser bias current through a suitable power supply (not shown) as well as thermal control of the laser wavelength.

An optical wave in a single mode fiber of a certain center frequency has three parameters which can continuously vary with time: amplitude, phase (frequency), and state of polarization. What is meant by "modulation format" is that one of these attributes, or a coupled combination of these, is made to vary in accordance with the information being imparted to that optical wave. The other parameters are not constrained to follow the information signal. Two modulation formats are different if the coupled combination of optical wave parameters (which can refer to a single parameter being varied) are substantially different. Modulator 38 uses a modulation format different from the modulation format of the optical signal input to optoelectronic converter 32. Typically, the incident optical signals are amplitude modulated. Advantageously, transponders 30 can employ modulators with power flat modulation formats such as frequency shift key (FSK) or polarization shift key (PolSK) to create optical signals which do not create time-dependent power variations within the optical system. A particularly preferred modulation format creates a non-zero chirped optical signal, a modulation format which varies both the amplitude and phase of the optical signal. Using the modulation format adjusting optical transponders, incident amplitude-modulated optical signals from optical transmitters can be converted to optical signals with a power-flat modulation format. However, it is understood that the invention encompasses any transponder which uses a modulator having a modulation format, whether amplitude, frequency, phase, or polarization based (or a combination thereof), which is different from the modulation format of the incident optical signal. Various modulation formats are described in further detail in the Gowar reference, cited above, and in Schwartz, *Information, Transmission, Modulation, and Noise,* (McGraw-Hill, N.Y.), c. 1990, the disclosure of which is incorporated by reference herein.

Figure 2:
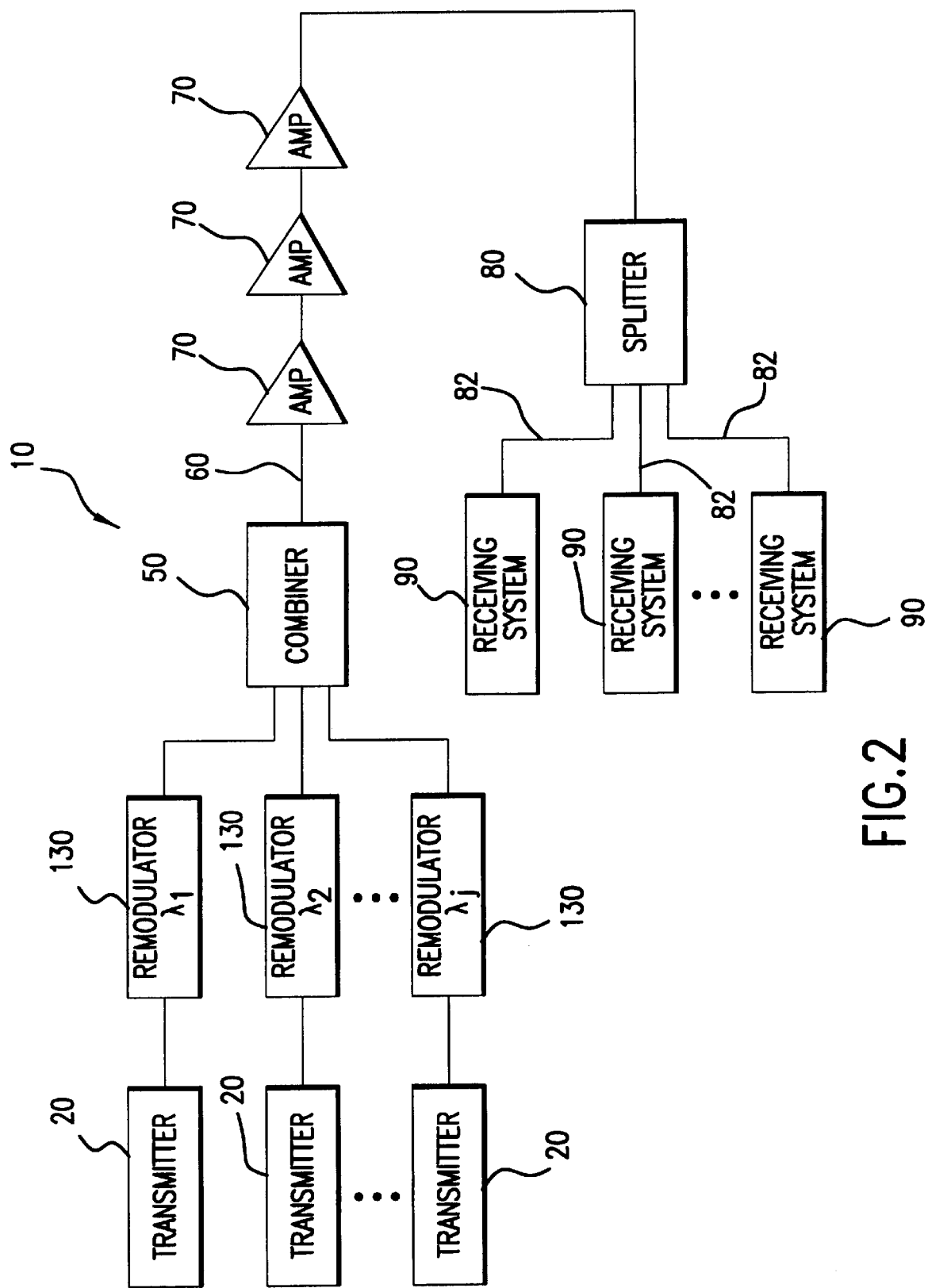
FIG. 2 schematically depicts a wavelength division multiplexed optical communication system employing the optical transponder of FIG. 1 as an optical remodulator.

FIG. 2 depicts a wavelength division multiplexed optical communication system 10 employing the modulation format adjusting transponders of FIG. 1 as optical remodulators. Optical communication system 10 takes optical transmission signals from diverse optical transmitters and other optical signal sources and maps the signal sources onto a wavelength division optical communication system, i.e., a communication system in which individual optical signals correspond to optical channels within a wavelength division multiplexed optical signal carried on an optical waveguide.

In the exemplary embodiment of FIG. 2, optical transmitters 20 are used to provide the information that will be carried by the optical channels within the WDM optical system. Optical transmitters 20 generally includes a laser, such as a DFB semiconductor laser, and a modulator for creation of an information-bearing optical signal. The expression "information-bearing optical signal," as used herein, refers to an optical signal which has been coded with information, including, but not limited to, audio signals, video signals, and computer data, generally through modulation. Alternatively, particularly for short-reach optical transmitters, the laser of optical transmitter 10 can be directly modulated. Because some of the transmitters may form part of an existing optical system, a wide variety of transmitters emitting in a broad range of wavelengths can be accommodated in the optical communication system of the present invention, thus ensuring compatibility with currently-deployed transmission equipment. Typical transmitters emit wavelengths ranging from about 1300 to 1600 nm. Transmitters in current optical communication systems and various optical modulation techniques employed therein are described in Gowar, *Optical Communication Systems,* incorporated by reference above. Optical transmitters suitable for use in the present invention are commercially available from NEC, Fujitsu, Alcatel, and Nortel.

Optical communication system 10 uses the modulation format adjusting transponders 30 of FIG. 1 as remodulators 130 for receiving the transmitted information-bearing optical signal and outputting an information-bearing optical signal at a WDM optical system channel wavelength $\lambda_j$. The subscript j ranges from 1 to 16 for the exemplary optical system of FIG. 1 but can also be, for example, 4, 8, or 32 depending upon the capacity needs of the optical route services by the system. Typically, the wavelengths emitted by the remodulators are selected to be within the 1500 nanometer range, the range in which the minimum signal attenuation occurs for silica-based fibers. More particularly, the wavelengths emitted by the remodulators are selected to be in the range from 1530 to 1560 nanometers. However, other wavelength bands may be selected according to overall system requirements.

Each optical channel is routed to optical combiner 50 for conveyance to optical waveguide 60. Optical combiner 50 is selected from any passive optical component which can combine plural wavelengths into a single output medium. Frequently, optical splitters used to divide a signal among plural outputs are used as optical combiners, operated in reverse fashion from the splitter. Exemplary optical combiners include 1×N passive splitters available from Corning, Inc., Corning, N.Y., 1×N wideband single mode splitters available from IOT Integrierte Optik GmbH, Waghausel-Kirrlach, Germany, and fused fiber combiners available from Gould, Inc., Millersville, Md. The combination of channels forms a multiplexed optical signal which is output to waveguide 60. Optical waveguide 60 is typically a single-mode optical fiber such as SMF-28, available from Corning, and TRUEWAVE, available from AT&T Corp./Lucent Technologies, and is the principal transmission medium for the optical communication system. However, any optical waveguide which is capable of transporting multiple optical wavelengths can be employed as waveguide 60 in optical system 10.

Optionally interposed along optical waveguide 60 are one or more optical amplifiers 70. Optical amplifiers 70 are selected from any device which directly increases the strength of plural optical signals without the need for optical-to-electrical conversion. In general, optical amplifiers 70 are selected from optical waveguides doped with rare earth ions such as erbium, neodymium, praseodymium, ytterbium, or mixtures thereof. Optical amplifiers, their materials , and their operation are further described in Gowar, Ed. *Optical Communication Systems,* incorporated by reference above and in Desurvire, *Erbium-Doped Fiber Amplifiers,* (John Wiley & Sons, Inc., N.Y.), c. 1994, and Bjarklev, *Optical Fiber Amplifiers: Design and System Applications,* (Artech House, Norwood, Mass.) c. 1993 the disclosures of which are incorporated by reference herein. An exemplary optical amplifier configuration is disclosed in U.S. patent application Ser. No. 08/554,976, the disclosure of which is incorporated by reference herein. Alternatively, other optical amplifiers, such as semiconductor optical amplifiers, may be used along transmission line 60.

Following transmission and amplification of the multiplexed optical signals along waveguide 60, each channel must be demultiplexed and routed to the receiver designated for the particular $\lambda_j$, channel. The multiplexed signal is input to optical splitter 80 which places a portion of the multiplexed signal onto plural output paths 82. Each output path 82 optically communicates with a receiving system 90. Optical splitter 80 is selected from any optical device which can divide an input optical signal and place it onto plural output paths. Exemplary splitters include passive optical components such as those components described for use as optical combiner 50. Receiving systems 90 typically include wavelength selectors (not shown) for selecting the particular channel, $\lambda_j$, from the multiplexed signal and a receiver (not shown). Exemplary receiving systems are described in U.S. Pat. No. 5,504,609 incorporated by reference above.

While the foregoing invention has been described in terms of the embodiments discussed above, numerous variations are possible. Accordingly, modifications and changes such as those suggested above, but not limited thereto, are considered to be within the scope of following claims.

What is claimed is:

1. A modulation format adjusting optical transponder comprising:

an optical-to-electrical conversion element configured to receive a single first optical signal having a first modulation format and carrying associated data, the optical-to-electrical conversion element outputting an electrical signal corresponding to said associated data of said first optical signal;

a laser; and a modulation circuit communicating with the optical-to-electrical conversion element and with the laser said modulation circuit being configured to control an output of said laser to transmit a single second optical signal carrying the associated data of said first optical signal, said second optical signal being modulated in accordance with a second modulation format different than said first modulation format such that said first optical signal having said first modulation format is retransmitted as said second optical signal having said second modulation format, there being a one-to-one correspondence between said first optical signal and said second optical signal.

2. A modulation format adjusting optical transponder as recited in claim 1 wherein the first modulation format is amplitude modulation and the second modulation format is frequency shift key modulation.

3. A modulation format adjusting optical transponder as recited in claim 1 wherein the first modulation format is amplitude modulation and the second modulation format is polarization shift key modulation.

4. A modulation format adjusting optical transponder as recited in claim 1 wherein the first modulation format is amplitude modulation and the second modulation format is chirped amplitude modulation comprising amplitude and phase modulation.

5. A wavelength division multiplexed optical communication system comprising:

a plurality of optical remodulators, each of which being configured to receive a respective one of a first plurality of optical signals, and outputting a respective one of a second plurality of optical signals, there being a one-to-one correspondence between each of said first plurality of optical signals and each of said second plurality of optical signals, each of the remodulators comprising:

an optical-to-electrical conversion element for receiving a respective one of a first plurality of optical signals and outputting an electrical signal corresponding to data carried by said respective one of said first plurality of optical signals;

a laser;

a modulation circuit communicating with the optical-to-electrical conversion element and with the laser and being configured to output a respective one of said second plurality of optical signals, each of which carrying said data carried by said respective one of said first plurality of optical signals and being modulated in accordance with a modulation format different than a modulation format associated with at least one of said first plurality of optical signals such that each of said first plurality of optical signals is retransmitted as a corresponding one of said second plurality of optical signals;

an optical waveguide;

an optical combining element being configured to receive said second plurality of optical signals produced by the remodulators, the optical combining element being configured to combine the second plurality of optical signals onto the optical waveguide;

a plurality of optical selectors optically communicating with the optical waveguide, each optical selector configured to select one or more of said second plurality of optical signals; and a plurality of optical receivers optically communicating with the optical selectors.

6. A wavelength division multiplexed optical communication system as recited in claim 5 wherein the first modulation format is amplitude modulation and the second modulation format is frequency shift key modulation.

7. A wavelength division multiplexed optical communication system as recited in claim 5 wherein the first modulation format is amplitude modulation and the second modulation format is polarization shift key modulation.

8. A wavelength division multiplexed optical communication system as recited in claim 5 wherein the first modulation format is amplitude modulation and the second modulation format is chirped amplitude modulation comprising amplitude and phase modulation.

\* \* \* \* \*